(12) United States Patent
Van Der Pouw

(10) Patent No.: US 6,541,095 B1
(45) Date of Patent: *Apr. 1, 2003

(54) FLATTENED TUBULAR FILM AND PROCESS FOR MANUFACTURING SUCH A FILM

(75) Inventor: Nicolaas C. Van Der Pouw, Enkhuizen (NL)

(73) Assignee: Solvay (Societe Anonyme), Brussels (BE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/231,667

(22) Filed: Jan. 15, 1999

(30) Foreign Application Priority Data

Jan. 16, 1998 (BE) .......................................... 09800032

(51) Int. Cl.⁷ .............................. B32B 3/00; B32B 1/00; B32B 3/12; B29D 22/00; B29D 23/00
(52) U.S. Cl. ..................... 428/72; 428/35.2; 428/35.7; 428/158; 428/166; 428/178; 428/180; 428/198
(58) Field of Search .............................. 428/35.2, 35.5, 428/178, 158, 198, 166, 72, 180, 35.4, 35.7, 36.6, 36.7, 36.9, 36.91

(56) References Cited

U.S. PATENT DOCUMENTS

| | | | |
|---|---|---|---|
| 3,660,189 A | * 5/1972 | Troy ........................... | 156/145 |
| 3,684,614 A | 8/1972 | Lemelson | |
| 3,904,465 A | * 9/1975 | Haase et al. ................. | 156/199 |
| 4,184,904 A | 1/1980 | Gaffney | |
| 4,305,988 A | * 12/1981 | Kocher ........................ | 428/158 |
| 4,681,723 A | * 7/1987 | Jester ........................... | 264/175 |
| 5,352,502 A | * 10/1994 | Fuller .......................... | 428/172 |
| 5,549,944 A | * 8/1996 | Abate ......................... | 428/35.2 |

FOREIGN PATENT DOCUMENTS

| | | |
|---|---|---|
| DE | 2210445 | 3/1972 |
| DE | 3919360 A1 | 12/1990 |
| EP | 0445793 A2 | 9/1991 |
| EP | 0519251 A2 | 12/1992 |

* cited by examiner

Primary Examiner—Harold Pyon
Assistant Examiner—Michael C. Miggins
(74) Attorney, Agent, or Firm—Venable, LLP; Marina V. Schneller

(57) ABSTRACT

The invention relates to a flattened tubular film (1) made of thermoplastic material, in which the inner faces are not welded or glued, and are in mutual contact only over a part of their surface, thus forming a plurality of cells (3) of determined shape, essentially hermetic, containing a gas. The invention also relates to a process for manufacturing such a film, by extruding a preform, introducing a gas into the preform and flattening using at least one cylinder (2) whose surface has a relief such that, during the flattening, the two inner faces of the film come into mutual contact only over a part of their surface, thus forming a plurality of cells of determined shape, substantially hermetic, in which the said gas is imprisoned.

9 Claims, 1 Drawing Sheet

FLATTENED TUBULAR FILM AND PROCESS FOR MANUFACTURING SUCH A FILM

BACKGROUND OF INVENTION

The present invention relates to a flattened tubular film and to a process for its production.

Plastic pouches or bags for medical use are conventionally made by extruding the plastic in the molten state through a tubular die in order to form a cylindrical film, blowing using a pressurized gas and flattening of this film without welding or gluing of its inner faces. The bags themselves are subsequently made from this film by cutting it up, inserting various accessories (connecting tubes, etc.) between the two walls and welding them together, usually at their ends or their periphery.

Most of the plastics used in this application have the drawback of creating blocking between the two inner faces of the flattened film. The consequence of this blocking is, in particular, that it makes it more difficult subsequently to separate the two faces of the film, in order to introduce the various accessories between them. The rate of production of such articles is reduced thereby, which leads to a certain economic disadvantage.

A second consequence of this blocking is that the two inner faces are in almost continuous mutual contact over the entire surface of the flattened film. During the subsequent step of welding the two inner faces together, there is thus no free volume, between these two faces and along the welded zone, to allow the formation of a welding bead, which guarantees good-quality welding. This phenomenon thus leads to welded articles whose weld strength may not be uniform, or may possibly even be deficient.

One attempt to solve this problem of blocking has been, for example, to create caulking on at least one of the inner faces of the flattened tubular film. For example, patent application EP-A-0,445,793 describes the creation of caulking on a tubular film over a part of its circumference by means of a specific temperature conditioning of the core of the annular die used.

However, this process is expensive and complex to implement and leads to articles whose overall transparency is reduced, which is a result to be avoided in the case of medical applications.

Consequently, the subject of the present invention is a flattened tubular film in which the subsequent separation of the two inner faces is easy, in which the welding together of the two inner faces leads to good-quality welding, and whose walls are highly transparent.

Consequently, the invention relates to a flattened tubular film made of thermoplastic material, of which the two inner faces are not welded or glued, which is characterized in that the said inner faces are in mutual contact only over a part of their surface, thus forming a plurality of cells of determined shape, essentially hermetic, containing a gas.

SUMMARY OF INVENTION

In the context of the present invention, the term "tubular film" is intended to refer to any hollow body of indefinite length whose average wall thickness is markedly less than a half-diameter of its transverse section. The thickness of the wall is generally between 0.01 and 2 mm, usually between 0.1 and 0.5 mm. The width of the flattened film is generally between 10 and 1000 mm.

The tubular film can quite equally be multilayer or monolayer, and oriented or non-oriented.

The term "flattened tubular film" is intended to denote any tubular film whose wall has been deformed so as to make two half-circumferences of the tubular film parallel and to bring them into mutual contact over a part of their inner face. This bringing in contact takes place under conditions, in particular of temperature and pressure, such that the two inner faces of the film remain distinct and separable later, i.e. they are not mutually welded or glued, i.e. there is no intentional bonding. This absence of intentional welding or gluing, in particular, distinguishes the films in accordance with the invention from the bubble films mainly used in packaging for protecting fragile articles.

The mutual bringing in contact of the said inner faces of the tubular film is partial, i.e. they are in mutual contact only over a part of their surface, the places in which there is no mutual contact thus forming a plurality of cells described below.

Hereinbelow, the flattened tubular film in accordance with the invention will thus be considered as comprising two walls, the width of which corresponds approximately to a half-circumference of the tubular film and an interface between the two inner faces of these walls. The said walls are in mutual contact only in certain regions of the interface, the other regions being occupied by the gas cells.

For the purpose of clarity hereinbelow, it will be assumed that the flattened tubular film has an essentially plane interface, but it can, quite obviously, be in any other configuration, for example rolled up or folded.

The term "thermoplastic material" denotes any thermoplastic polymer, including thermoplastic elastomers, as well as mixtures thereof. The term "polymer" denotes both homopolymers and copolymers (in particular binary or ternary polymers), for example randomly-distributed copolymers, sequenced copolymers, block copolymers, grafted copolymers, etc.

Preferably, the thermoplastic material consists essentially of one or more polymers chosen from plasticized vinyl chloride polymers, polyolefins, polyesters and polyamides.

The term "plasticized vinyl chloride polymer" is intended to denote any vinyl chloride homopolymer, any vinyl chloride copolymer and mixtures of these homo- and/or copolymers. The polymer is said to be plasticized when it comprises a substantial amount of plasticizer, in particular at least 20 parts of plasticizer per 100 parts of polymer (by weight). Any type of plasticizer can be used, the amount present obviously being adapted in consequence. For example, alkyl phthalates, citrates, trimellitates and phosphates are widely used. The plasticizer used can also be polymeric, which has the advantage of reducing its exudation.

The term "polyolefin" is intended to denote any olefin homopolymer, any copolymer containing at least two different olefins and any copolymer comprising at least 50% by weight of olefin-derived units. In the latter case, the comonomer can be of any other nature. It can be, in particular, a vinyl ester, for example vinyl acetate.

In the case of a polyolefin, this material can advantageously be mixed with at least one elastomer, for example such as a styrene/ethylene butylene/styrene (SEBS) or styrene/ethylene propylene/styrene (SEPS) three-block copolymer. In this case, the content of the elastomer mixture can be up to 80% by weight.

The term "polyester" is intended to denote any thermoplastic homopolymer or copolymer comprising repeating units linked by ester-type functions integrated into the polymer backbone.

The term "polyamide" is intended to denote any thermoplastic homopolymer or copolymer comprising repeating units linked by amide-type functions integrated into the polymer backbone.

More preferably, the thermoplastic material consists essentially of a plasticized vinyl chloride polymer (PVC).

Advantageous results have also been obtained with a thermoplastic material essentially consisting of a random copolymer of ethylene and vinyl acetate (EVA).

One or more standard, polymeric or non-polymeric additives, such as organic or inorganic fillers, reinforcing materials, plasticizers, stabilizers, lubricants, etc., can be added to the thermoplastic material.

The gas filling the cells located between the two inner faces of the flattened film can be of any nature or can be a mixture of different gases. This gas may be, in particular, air, nitrogen or carbon dioxide. Preferably, and in particular for economic reasons, the gas is essentially air.

In order to prevent any contamination, the gas is preferably free of foreign bodies such as dust or bacteria.

In the context of the present invention, the gas cells of determined shape are located between the two inner faces of the flattened film. This means that the two faces of the film are not in mutual contact over their entire surface and that the zones in which they are not in contact thus contain a gas, so as to form a plurality of cells. These cells are macroscopic and, by virtue of the blocking between the two faces of the film at the periphery of the cells, they are essentially hermetic and of fixed geometry.

In the direction perpendicular to the flattened film, it is advantageous for the thickness of the gas cells to be low relative to the thickness of the wall of the film. Preferably, the cell thickness is not greater than 50% of the thickness of the wall of the film. In a more preferred manner, the cell thickness is not greater than 25% of the thickness of the wall of the film.

In the plane of the interface between the two walls of the film, the gas cells are of determined shape, i.e. of controlled and non-random shape. The shape can be regular or irregular. However, it has proven to be preferable for the gas cells to be arranged between the inner faces of the flattened film in a regular pattern. In this case, it is also preferable for at least one of the characteristic dimensions of the cells in this plane to be markedly less than the width of the flattened film.

The regular pattern can be, for example, a network of identical or mixed geometrical shapes such as, in a non-limiting manner, discs, ovals, rectangles, rhombi, squares, etc.

The pattern is advantageously such that the ratio between the sum of the surfaces occupied by the gas cells and the total surface of the interface is not less than 0.25. Even more advantageously, this ratio is not less than 0.50.

Similarly, it is preferable for this ratio not to be greater than 0.98. Even more preferably, it is not greater than 0.95.

One configuration which is particularly useful in the case of a regular pattern has proven to be such that any plane perpendicular to the longitudinal axis of the said flattened film encounters at least one gas cell. A pattern which has given very good results consists of square-shaped cells in which one of the diagonals is approximately parallel to the longitudinal axis of the flattened film and in which the side length is greater than the distance separating two neighbouring cells.

The flattened tubular film in accordance with the invention can be used in many fields. However, given its properties, the preferred applications will be made in areas of a medical nature.

Consequently, the invention also relates to the use of at least one flattened tubular film as described above for the manufacture of an article for medical use.

The term "medical use" is intended to refer to any application relating to the art of maintaining or re-establishing human or animal health. This especially includes surgery, pharmacy and dentistry.

Another subject of the invention consists of an article for medical use comprising at least one flattened tubular film as described above.

The article with which the present invention is concerned can be of any nature. It can be, in particular, a bag, a dressing, an undersheet, etc.

It is preferably a bag.

The said bag can be intended to contain, in particular, blood, serum, a solution, biological tissue or fluid or a nutrient solution.

Such a bag is advantageously made from a flattened tubular film in accordance with the invention given, on the one hand, the ease with which the walls of the said flattened tubular film can be separated to allow the introduction of the various bag accessories, and, on the other hand, the increased assurance of stronger welding.

The Applicant has observed that it is particularly advantageous to manufacture the flattened tubular film in accordance with the invention by extrusion and flattening of a tubular film. Another subject of the invention thus consists of such a process.

Consequently, the invention also relates to a process for manufacturing a flattened tubular film as described above, comprising the steps of:

(a) extruding a cylindrical preform made of thermoplastic material,
(b) introducing a pressurised gas into the said preform, with formation of a tubular film,
(c) flattening the said tubular film using at least one pair of cylinders, without welding or gluing of its two inner faces, which is characterized in that the surface of at least one of the cylinders has a relief such that, during the flattening, the two inner faces of the film come into mutual contact only over a part of their surface, thus forming a plurality of cells of determined shape, substantially hermetic, in which the said gas is imprisoned.

The term "preform" denotes here any hollow body of tubular shape and of indefinite length. The characteristics of this preform are identical to those, described above, of the tubular film, except for the fact that its average wall thickness is not necessarily markedly less than a half-diameter of its transverse section.

The plastic constituting the preform can be extruded according to any process known to those skilled in the art. In particular, single-screw or twin-screw extruders can be used, as can the coextrusion technique.

The extrusion head can also be of any suitable confirmation or orientation, in particular vertical or horizontal.

The die used is a die with a core. It can be of any geometry which is compatible with the plastic used. Preferably, it is an annular die.

The gas is introduced under pressure into the preform, i.e. between the die and the pair of cylinders which flatten the film. Conventionally, the gas is introduced via the core of the die. The gas can, preferably, be filtered beforehand.

The introduction of the gas under pressure into the preform generally leads to an increase in the diameter of the said preform, with a corresponding decrease in the wall thickness. When the diameter of the preform is rapidly fixed after leaving the die, for example by means of a sizer, this increase in diameter can, however, be very small.

Whether or not there is a substantial increase in the diameter of the preform, it will be considered here that the said preform, after introduction of the gas, forms a tubular film.

The pair(s) of cylinders which flatten the tubular film are arranged downstream of the die, usually perpendicular to the longitudinal axis of the tubular film. The pair of cylinders which bring the two inner faces of the tubular film in contact pinch the film under conditions, in particular of temperature and pressure, such that there is no welding or gluing of the two inner faces of the film. The gas pressure inside the preform causes the wall of the film to be applied in the hollows of the relief present on the surface of at least one of these cylinders. During passage of the two opposite portions of the wall of the film into the gap between the said cylinders, the gas present in the hollows thus formed on the inner face of the film is imprisoned between the two walls, forming therein cells of determined shape, in a pattern corresponding to the pattern of the relief present on the surface of the cylinder(s).

It should be pointed out that when the surface of each cylinder has a certain relief, the patterns of these reliefs must correspond so as to form closed gas cells.

Excellent results have been obtained using a cylinder whose surface has a relief, the other cylinder being smooth in this case.

The surface of the cylinders can be of any nature which is compatible with the plastic used. It can be made, in particular, of steel, rubber or polyurethane.

It should be noted that the process in accordance with the invention can also include other steps, prior to, during or inserted between the steps listed above. Mention is made in particular of the steps of sizing, cooling or rolling of the tubular film.

The process in accordance with the invention is particularly advantageous for the manufacture of articles for medical use.

Consequently, the invention also relates to a process for manufacturing an article for medical use, comprising a step of manufacturing a flattened tubular film as described above, followed by at least one step of mutual welding of the two walls of the said flattened tubular film.

The welding step can be carried out according to any welding technique which is applicable to the plastic used. It can be, in particular, heat-welding (supply of heat via a heating tool) or high-frequency or radio-frequency welding (electronic excitation by applying an alternating electric field).

The mutual welding of the two walls is carried out on a part of the surface of the said walls, depending on the type of article to be manufactured. Usually, the welding is carried out at the ends or at the periphery of the flattened tubular film.

The welding step can also be preceded, followed or accompanied by other steps, for example of cutting.

This welding step can also be carried out, without preference, in line with the apparatus for manufacturing the flattened tubular film, or thereafter, optionally after a step of storing the said film, for example in the form of a roll.

The article for medical use manufactured by means of the process in accordance with the invention can be of any nature. It can be, in particular, a bag, a dressing, an undersheet, etc.

It is preferably a bag.

The said bag can be intended to contain, in particular, blood, serum, a solution, biological tissue or fluid or a nutrient solution.

The attached figures and the example which follows illustrate, in a non-limiting manner, one of the preferred embodiments of a flattened tubular film in accordance with the invention, as well as one of the preferred embodiments of a process for manufacturing such a film:

It can be seen that, by virtue of the geometrical characteristics of the pattern chosen for the arrangement of the air cells, any plane parallel to AA" inevitably encounters at least one air cell (at least six in the present case).

Figure 1:
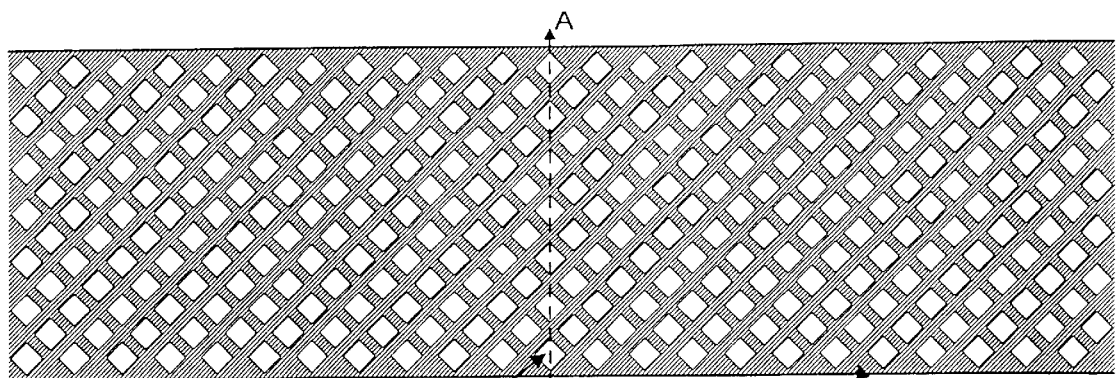
FIG. 1 is a front view of a portion of a flattened tubular film (1) between the inner faces of which are located square-shaped air cells (3). The shaded zone represents the region of mutual contact between the two walls of the film. The clear parts represent the air cells.
Figure 2:
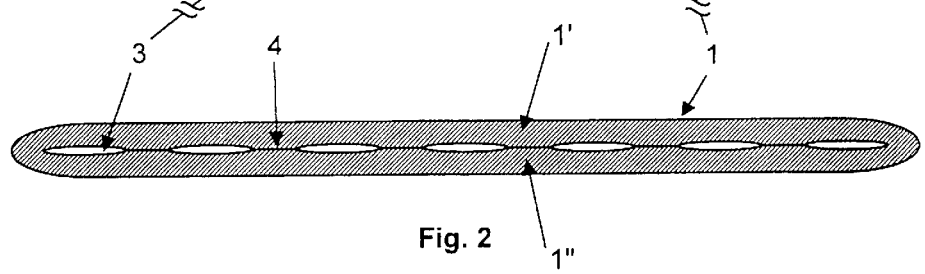
FIG. 2 is an enlargement of a vertical section along the plane AA' of FIG. 1, the said plane being perpendicular to the longitudinal axis of the tubular film. This shows the two walls (1', 1") of the film, the interface (4) between the inner faces of these walls and the air cells (3).
Figure 3:
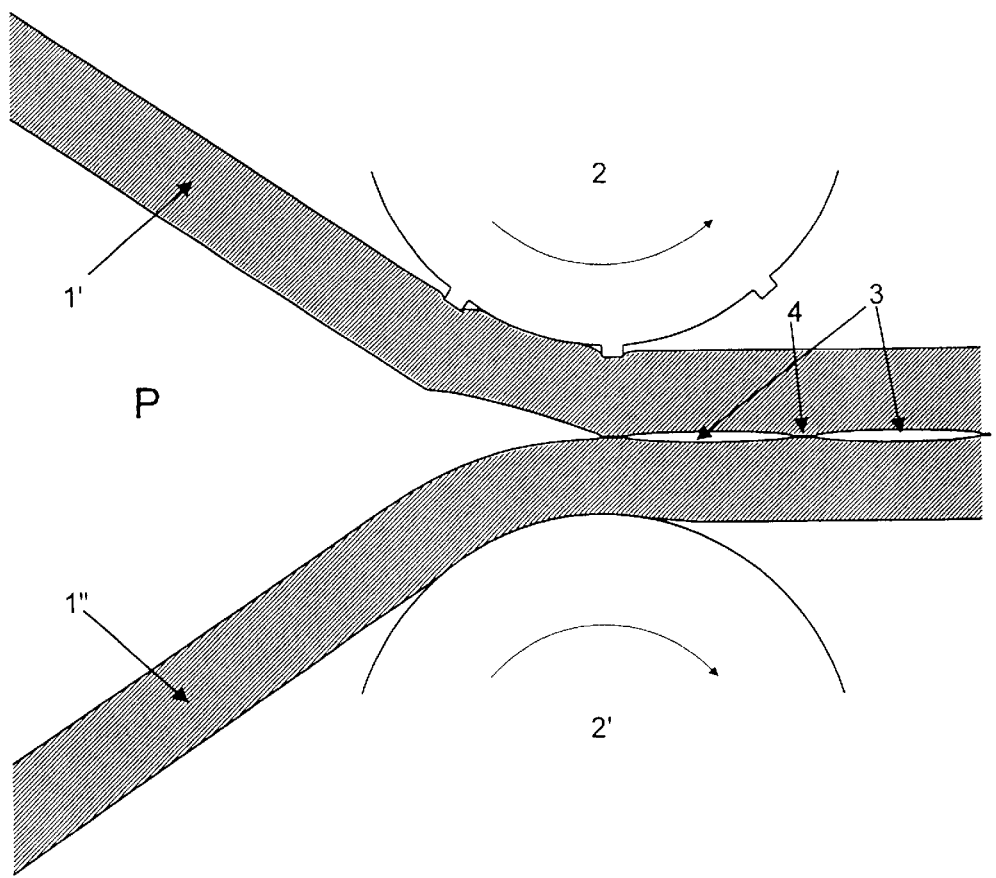

FIG. 3 is a partial view of apparatus for manufacturing a flattened tubular film similar to that of FIGS. 1 and 2. It shows, more particularly, the step for flattening the film.

DESCRIPTION OF THE PREFERRED EMBODIMENT

A preform is extruded using an extruder fitted with an annular die (not represented). Pressurised filtered air is introduced via the core of the die into the preform. After cooling, the walls (1', 1"") of the tubular film (1) are flattened by means of a pair of cylinders (2, 2'). The surface of one of the cylinders (2) has a relief, in this case a regular network of hollow squares. The wall (1') of the tubular film is applied, at least partially, to the bottom of the hollows on the surface of the cylinder, by means of the pressure P prevailing inside the tubular film.

The travelling motion of the film results in the imprisonment of air cells (3) between the two walls of the flattened film.

EXAMPLE

A PVC tubular film comprising 33% plasticizer and with an average wall thickness of 0.35 mm was flattened using a pair of cylinders, one of which had a steel surface with a relief consisting of hollow squares with a side length of 10 mm and a depth of 1 mm. These hollows were separated by a partition 2 mm wide. The second cylinder had a smooth polyurethane surface. Square air cells, ranging in thickness between 0.01 and 0.06 mm, were thus created between the two inner faces of this film.

A reel was then made by rolling up 100 m of this flattened film (width: 220 mm) on a mandrel.

The properties of mutual blocking of the two inner faces of the flattened film were measured according to the following procedure:

cutting out a sample 5 cm wide and at least 10 cm long from the centre of the flattened film (perpendicular to the longitudinal axis of the film), at three different locations on the reel: in the outer region, in the intermediate region and at the core of the reel;

separating, at one of the ends of the sample, the edges of the two walls and introducing each of these edges into a jaw of a traction machine;

continuing the separation of the two walls with the traction machine, at a speed of 100 mm/min;

measuring the force required for this separation (in N/m). The results are as follows:

Outer region: 6.8 N/m

Intermediate region: 6.9 N/m

Core region: 8.0 N/m

A tubular film of identical composition, prepared according to the same procedure, except that the air cells were not introduced between the faces of the film, has blocking of about 15 to 20 N/m.

What is claimed is:

1. A flattened tubular film of thermoplastic material comprising inner faces which are distinct from each other and wherein the two inner faces are not welded and not glued to each other but are separable subject only to force to overcome blocking between said two inner faces; wherein at least one of said two inner faces comprises a pattern in relief and hollows, wherein said hollows contain gas; wherein said two inner surfaces are in mutual contact only over part of their surfaces wherein said mutual contact between said two inner faces provides essentially hermetic cells due to blocking at an area of said mutual contact . . . "has been deleted and the text " two distinct parallel inner faces, wherein both inner faces comprise half-circumferences, where said inner faces are in mutual contact only between said half-circumferences in a discrete pattern, wherein said two inner faces are not welded or glued, wherein said half-circumferences contain gas, and wherein said half-circumferences provide hermetic gas cells.

2. The flattened tubular file according to claim 1, in which the thermoplastic material consists essentially of a plasticized vinyl chloride polymer or a random copolymer of ethylene and vinyl acetate.

3. The flattened tubular film according to claim 1, in which the gas consists essentially of air.

4. The flattened tubular film according to claim 1, in which the gas cells are arranged between the inner faces of the flattened film in a rectangular pattern.

5. The flattened tubular film according to claim 4, in which the pattern is such that any plane perpendicular to the longitudinal axis of the said flattened film encounters at least one gas cell.

6. The flattened tubular film according to claim 5, in which the pattern consists essentially of square-shaped cells in which one of the diagonals is approximately parallel to the longitudinal axis of the flattened film and in which the side length is greater than the distance separating two neighbouring cells.

7. An article for medical use comprising at least one flattened tubular film according to claim 1.

8. The article according to claim 7 in the form of a bag wherein said bag is made by mutual welding of two walls of the flattened tubular film at the ends or at a periphery of the flattened tubular film.

9. An article in the form of a bag comprising said film of claim 1, welded at an end or at a periphery of said flattened tubular film.

* * * * *

UNITED STATES PATENT AND TRADEMARK OFFICE
CERTIFICATE OF CORRECTION

PATENT NO. : 6,541,095 B1
APPLICATION NO. : 09/231667
DATED : April 1, 2003
INVENTOR(S) : Nicholas C. Van Der Pouw It is certified that error appears in the above-identified patent and that said Letters Patent is hereby corrected as shown below:

IN THE CLAIMS:
Col. 7, Lines 19 - Col 8, Lines 3, Claim 1 should read
-- Claim 1. A Flattened tubular film of thermoplastic material comprising two distinct parallel inner faces, wherein both inner faces comprise half-circumferences, where said inner faces are in mutual contact only between said half-circumferences in a discrete pattern, wherein said two inner faces are not welded or glued, wherein said half circumferences contain gas, and wherein said half-circumferences provide hermetic gas cells --.

Signed and Sealed this

Eighth Day of August, 2006

JON W. DUDAS
*Director of the United States Patent and Trademark Office*